(12) United States Patent
Green

(10) Patent No.: US 7,397,811 B2
(45) Date of Patent: Jul. 8, 2008

(54) METHOD AND APPARATUS FOR DETERMINING SHARED BROADCAST DOMAINS OF NETWORK SWITCHES, PORTS AND INTERFACES

(75) Inventor: David James Green, Butler, PA (US)

(73) Assignee: Ericsson AB, Stockholm (SE)

( * ) Notice: Subject to any disclaimer, the term of this patent is extended or adjusted under 35 U.S.C. 154(b) by 922 days.

(21) Appl. No.: 10/422,572

(22) Filed: Apr. 23, 2003

(65) Prior Publication Data
US 2004/0213211 A1 Oct. 28, 2004

(51) Int. Cl.
*H04L 12/28* (2006.01)
*H04L 12/56* (2006.01)
(52) U.S. Cl. .................. 370/432; 370/419; 370/390
(58) Field of Classification Search .............. 370/400, 370/401, 389, 397, 392, 399, 466, 467, 252, 370/347, 419, 432, 390; 709/220–229
See application file for complete search history.

(56) References Cited
U.S. PATENT DOCUMENTS
5,752,003 A * 5/1998 Hart ........................ 709/223
5,968,126 A * 10/1999 Ekstrom et al. ............. 709/225
6,147,995 A 11/2000 Dobbins et al. ............. 370/392
7,154,899 B2 * 12/2006 Khill ........................ 370/401
2001/0005369 A1 6/2001 Kloth ........................ 370/466
2002/0012327 A1 * 1/2002 Okada ....................... 370/328
2004/0037279 A1 * 2/2004 Zelig et al. .................. 370/390

FOREIGN PATENT DOCUMENTS
WO WO 2004/004217 A 1/2004

* cited by examiner

*Primary Examiner*—John Pezzlo
(74) *Attorney, Agent, or Firm*—Ansel M. Schwartz

(57) ABSTRACT

A system for determining shared broadcast domains. The system includes a network having devices which have physical ports and/or logical interfaces, and having a network management system. The network management system having a mechanism for learning features about ports or interfaces of devices of the network. The system includes a mechanism for identifying which ports or interfaces on each device are part of a same broadcast domain from the learned features. The identifying mechanism in communication with the network management system. A network management system. A method for determining shared broadcast domains of network devices and ports or interfaces includes the steps of learning features about ports or interfaces of devices of a network by a network management system. There is the step of identifying which ports or interfaces on each device are part of a common broadcast domain from the learned features.

28 Claims, 2 Drawing Sheets

US 7,397,811 B2

METHOD AND APPARATUS FOR DETERMINING SHARED BROADCAST DOMAINS OF NETWORK SWITCHES, PORTS AND INTERFACES

FIELD OF THE INVENTION

The present invention relates to determining shared broadcast domains of a network. More specifically, the present invention relates to determining shared broadcast domains of a network based on learned features about ports or interfaces of devices of the network.

BACKGROUND OF THE INVENTION

Multi-port Network Devices such as Ethernet, ATM or multiservice IP/MPLS Switches can support multiple broadcast domains via 802.1Q Virtual LANs (VLANs), Port-based VLANs, ATM VLANs and ELANs (Emulated LANs), or MAC address-based VLANs. When several such devices are connected together, it can be difficult to determine which physical switch ports or logical switch interfaces (such as ATM or Frame Relay Virtual Circuits or MPLS Label Switched Paths) are in the same broadcast domain, i.e., are able to receive broadcasts from other devices attached to other switch ports or interfaces. The present invention uses the learned MAC addresses, device IDs, ports or interfaces, and VLAN names or VLAN IDs (VIDs) that are learned by a Network Management System (NMS) to construct a table that accurately determines which ports or interfaces on each device are part of the same broadcast domain. This is a critical component for supporting Discovery and Provisioning of Transparent LAN Services (TLS) by a Service Provider (or large Enterprise) from any customer's LAN to other LANs belonging to the same customer via the Service Provider's network. Without such a technique, an NMS or Element Management System (EMS) could mistakenly provision switch ports or interfaces into the wrong broadcast domain/VLAN, thereby introducing network traffic from one customer's LAN into another customer's LAN. This would not only result in a security breach of the customers' networks, but could also adversely impact the customer's network routing, switching, and addressing configuration such that internal customer network services would be disrupted or disabled.

SUMMARY OF THE INVENTION

The present invention pertains to a system for determining shared broadcast domains. The system comprises a network having devices which have physical ports and/or logical interfaces, and having a network management system. The network management system having means for learning features about ports or interfaces of devices of the network. The system comprises means for identifying which ports or interfaces on each device are part of a common broadcast domain from the learned features. The identifying means in communication with the network management system.

The present invention pertains to a network management system of a network having devices with ports or interfaces. The network management system comprises means for learning features about ports or interfaces of devices of the network. The network management system comprises means for identifying which ports or interfaces on each device are part of a common broadcast domain from the learned features, the identifying means in communication with the learning means.

The present invention pertains to a method for determining shared broadcast domains of network devices and ports or interfaces comprising the steps of learning features about ports or interfaces of devices of a network by a network management system. There is the step of identifying which ports or interfaces on each device are part of a same broadcast domain from the learned features.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
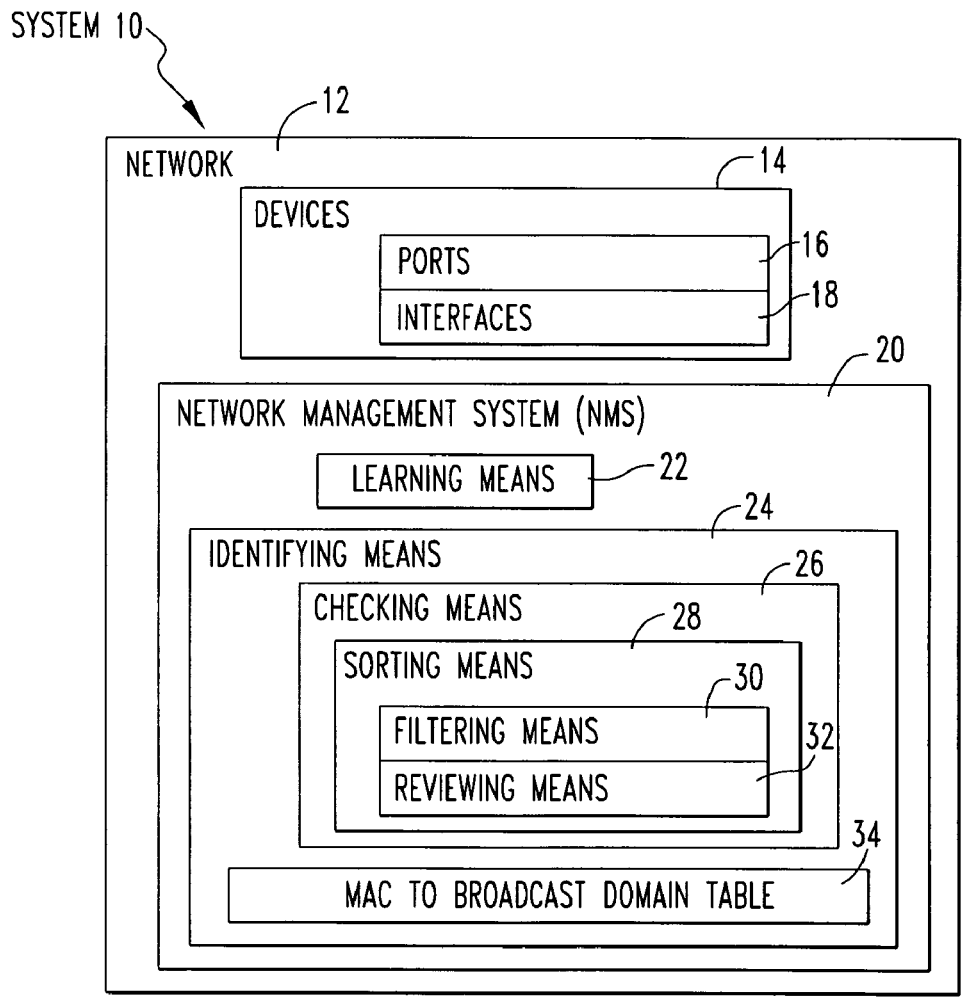
FIG. 1 is a schematic representation of a system of the present invention.

Referring now to the drawings wherein like reference numerals refer to similar or identical parts throughout the several views, and more specifically to FIG. 1 thereof, there is shown a system 10 for determining shared broadcast domains. The system 10 comprises a network 12 having devices 14 which have physical ports 16 and/or logical interfaces 18, and having a network management system 20. The network management system 20 having means for learning features about ports 16 or interfaces 18 of devices 14 of the network 12. The system 10 comprises means for identifying which ports 16 or interfaces 18 on each device are part of a common broadcast domain from the learned features. The identifying means 24 in communication with the network management system 20.

Preferably, the identifying means 24 includes means for checking for shared features in the devices 14. The checking means 26 preferably includes means for sorting the features based on MAC addresses. Preferably, the checking means 26 includes means for sorting the features based on the learned state. The checking means 26 preferably includes means for sorting the features based on device IDs. Preferably, the checking means 26 includes means for sorting the features based on port 16 or interface 18 where learned. The checking means 26 preferably includes means for sorting the features based on VLAN name and/or VID.

Preferably, the means for sorting the features based on MAC addresses includes means for filtering out all the multicast or broadcast addresses. The means for sorting the features based on learned state preferably includes means for sorting the features based on self, then learned.

Preferably, the means for sorting the features based on device IDs includes means for reviewing the discovery of duplicate MAC addresses on different network forwarding devices 14, as well as the ports 16 or interfaces 18 that they are learned on, in order to identify these devices' adjacencies and membership in a common broadcast domain. Logical interfaces 18 are preferably used to identify device adjacencies and membership in the common broadcast domain. Preferably, the network management system 20 has a MAC-to-broadcast domain table 34 that has shared broadcast domains of the network 12.

The present invention pertains to a network management system 20 of a network 12 having devices 14 with ports 16 or interfaces 18. The network management system 20 comprises means for learning features about ports 16 or interfaces 18 of devices 14 of the network 12. The network management system 20 comprises means for identifying which ports 16 or interfaces 18 on each device are part of a common broadcast domain from the learned features, the identifying means 24 in communication with the learning means 22.

The present invention pertains to a method for determining shared broadcast domains of network devices 14 and ports 16 or interfaces 18 comprising the steps of learning features about ports 16 or interfaces 18 of devices 14 of a network 12 by a network management system 20. There is the step of identifying which ports 16 or interfaces 18 on each device are part of a common broadcast domain from the learned features. Preferably, the identifying step includes the step of checking for shared features in the devices 14. The checking step preferably includes the step of sorting the features based on MAC addresses. Preferably, the checking step includes the step of sorting the features based on the learned state. The checking step preferably includes the step of sorting the features based on device IDs. Preferably, the checking step includes the step of sorting the features based on port 16 or interface 18 where learned. The checking step preferably includes the step of sorting the features based on VLAN name or VID.

Preferably, the step of sorting the features based on MAC addresses includes the step of filtering out all the multicast or broadcast addresses. The step of sorting the features based on learned state preferably includes the step of sorting the features based on self, then learned. Preferably, the step of sorting the features based on device IDs includes the step of reviewing the discovery of duplicate MAC addresses on different network forwarding devices 14, as well as the ports 16 or interfaces 18 that they are learned on, in order to identify these devices' adjacencies and membership in a common broadcast domain. Both physical ports 16 and logical interfaces 18 are preferably used to identify device adjacencies and membership in a common broadcast domain.

In the operation of the invention, the ability to use an NMS to accurately determine the broadcast domain/VLAN membership of individual network 12 switches and their ports 16 or interfaces 18 provides a number of benefits:

Improved network security—a network administrator can quickly determine which network devices 14 can directly receive each other's network 12 traffic.

More reliable discovery and reporting for NMS developers—by using this method rather than relying on just the VLAN names, IDs, tagging options, etc. as they are configured on individual network 12 elements, an NMS developer can provide accurate information even if the network 12 elements are mis-configured.

Better information with no additional network 12 traffic—many NMSs will already have discovered the required information to implement this method, so little extra coding and no additional network 12 management station queries are required.

Lower possibility of mis-configuring network 12 elements and resultant service contract violations—by providing accurate information about network 12 broadcast domains, this Method greatly diminishes the possibility of mis-configuring connections between network 12 elements and end-user devices, negative effects on internal or customer's networks, contract violations or lawsuits due to network 12 disruptions, etc.

The synchronization of broadcast domains/VLANs by an NMS relies on the fact that if two or more network devices 14 learn the same unicast MAC address, those ports 16 or interfaces 18 on which that MAC address was learned must be in the same broadcast domain. Put another way, all the rules of network 12 bridging and routing depend on the fact that one device cannot learn the unicast MAC address of another device unless those two devices are in the same broadcast domain and can communicate directly with one another using Layer 2 addressing. Marconi's ServiceOn Data NMS uses the term "High-level VLANs" to describe such a multi-device broadcast domain. Devices 14 that are in different broadcast domains/VLANs cannot communicate unless a router forwards frames between them. The originating device must send its frame to the MAC address of the router, with its own address as the source MAC; the Layer 3 addresses (IP, IPX, AppleTalk, etc.) will of course be those of the actual source and destination devices 14. The router between the two broadcast domains must lookup the destination Layer 3 address, figure out the next hop to it, then rebuild the frame and change the destination MAC address to either that of the destination device or the next-hop router (if there is one), and must use the MAC for its interface 18 in that broadcast domain/subnet as the source MAC address for the frame.

In order to exploit the "shared MAC addresses=same broadcast domain/VLAN" rule defined above, certain information must be gathered from network devices 14 by the NMS. Although the layout of the various tables may differ from one device to another, there are 5 key fields in each of them that can be used to determine adjacencies of devices:

1. MAC Addresses
2. "Learned" state (Yes or No—Is this MAC Not Me' or 'Me'?)
3. Device Name/ID (from the NMS database)
4. Port/Interface where address was learned
5. VID and/or VLAN name By using this information and checking for shared MAC addresses in multiple devices' Address Forwarding Tables (AFTs), the NMS can determine shared broadcast domains by building a MAC-to-broadcast domain table 34 sorted as follows:

1. First Key: Sort based on MAC addresses and filter out any Multicast or Broadcast addresses (any MACs where the first byte is an odd number) since those MACs are not device-specific (i.e. they relate to a group of devices rather than a single one).

2. Second Key: Sort next based on "Learned" state (Self first, then Learned)—learn which network 12 device a MAC belongs to, if possible.

3. Third Key: Sort next based on Device IDs (from the NMS database)—look for duplicate MACs on the same device that are learned on different ports 16 or interfaces 18 (device may have moved but AFT hasn't aged out the old port number yet).

4. Fourth Key: Sort next based on Port 16 or Interface 18 where learned (in case duplicate MACs are found in Key 3).

5. Fifth Key: Sort last based on 802.1Q VID or VLAN Name (again in case duplicate MACs are found in different VLANs).

With reference to the following table, the reasons VIDs and/or VLAN Names are sorted last is because the VIDs and/or VLAN Names may NOT match, even though the devices 14 are all in the same broadcast domain! This would be an "Inconsistent Sync" status for the high-level VLAN.

| MAC-to-Broadcast Domain Table | | | | |
|---|---|---|---|---|
| MAC Address | Learned | Device ID | Port | VLAN ID | VLAN Name |
| 000102030405 | Self | ES-1300 | 0 | 131 | ES-131 |
| 000102030405 | Yes | ES-1000 | S2P1 | — | ESQALAB |

-continued

MAC-to-Broadcast Domain Table

| MAC Address | Learned | Device ID | Port | VLAN ID | VLAN Name |
|---|---|---|---|---|---|
| 000102030405 | Yes | ES-1200 | GIGA1 | 2 | ES-PORT |
| 000102030405 | Yes | ESR-5000 | 2/1 | 131 | ES-131 |
| 002048740329 | Self | ES-1200 | — | 2 | ES-PORT |
| 002048740329 | Yes | ES-1000 | S2P1 | — | ESQALAB |
| 002048740329 | Yes | ES-1300 | 1 | 131 | ES-131 |
| 002048740329 | Yes | ESR-5000 | 3/2 | 131 | ES-131 |
| 0020488A6882 | Self | ESR-5000 | router 1/63 | 131 | ES-131 |
| 0020488A6882 | Yes | ES-1000 | S2P1 | — | ESQALAB |
| 0020488A6882 | Yes | ES-1200 | GIGA1 | 2 | ES-PORT |
| 0020488A6882 | Yes | ES-1300 | 1 | 131 | ES-131 |
| 0020488B9C05 | Yes | ES-1200 | GIGA1 | 2 | ES-PORT |
| 0020488B9C08 | Yes | ES-1000 | S2P1 | — | ESQALAB |
| 0020488B9C08 | Yes | ES-1300 | 1 | 131 | ES-131 |
| 0080C83ED568 | Self | ES-1000 | 0 | — | ESQALAB |
| 0080C83ED568 | Yes | ES-1200 | GIGA1 | 2 | ES-PORT |
| 0080C83ED568 | Yes | ES-1300 | 6 | 131 | ES-131 |
| 0080C83ED568 | Yes | ESR-5000 | 2/1 | 131 | ES-131 |

Four instances of the same MAC addresses appear on the same set of devices; therefore, they must be in the same broadcast domain.

Note that the VIDs and Names do NOT match, even though the devices are all in the same broadcast domain! This would be an "Inconsistent Sync" status for the high-level VLAN.

NOTE: the "high-level VLAN" mentioned in the table above is another term for a broadcast domain. Marconi's ServiceOn Data NMS uses this term to describe the aggregation of individual device-specific VLANs on one or more directly connected devices 14 that form a single broadcast domain.

Figure 2:
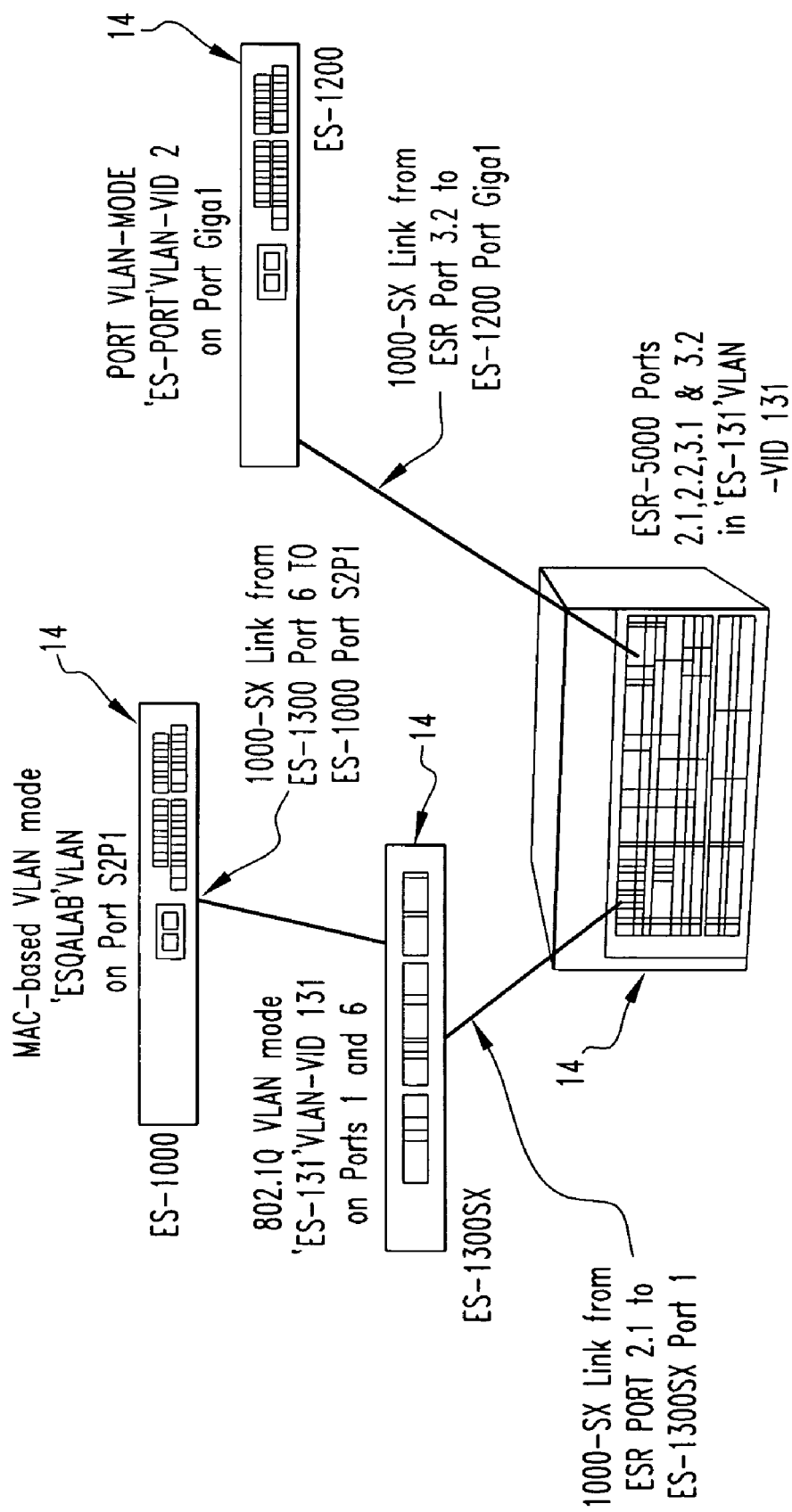
FIG. 2 is a schematic representation showing physical connections between devices.

Once this table has been built and it has been discovered which MAC addresses are not learned and therefore belong to individual switches and routers, the NMS can determine which ports 16 or interfaces 18 are used to connect these devices 14 to one another. For example, the ES-1200's MAC has been learned by the ESR-5000 on its port 3/2, and the ESR's MAC has been learned by the ES-1200 on its port GIGA1. Since no other network 12 device (i.e. MAC address) has been learned by the ESR on port 3/2, it can be assumed that this port links the ESR directly to the ES-1200. And since the ES-1200 has learned ALL of the other network 12 device MAC addresses on its port GIGA1, it can be assumed that the ESR must be the intermediate device that connects the ES-1200 to the other network devices 14 (ES-1000 and ES-1300) in the same broadcast domain. FIG. 2 shows the actual physical connections between the devices 14.

The NMS should keep special watch on the status of "trunk ports"; these are the physical ports 16 that link network devices 14 such as switches and routers to one another. If the status of these links or the trunk port itself is DOWN, then this means that the broadcast domain has been split; the NMS should then change the High-level VLAN status to indicate a serious problem exists with that broadcast domain due to its "disjoint" status.

Note also that even though all four devices 14 listed above are in the same broadcast domain, the VID and VLAN name assigned on these devices 14 differs! The NMS should report the synchronization status of this high-level VLAN as "Inconsistent"; it should also offer the user a means of synchronizing the VLAN names on specific devices 14 to match those of the other device VLANs in the same broadcast domain. However, it should NOT attempt to change the VIDs of any device VLANs since the network devices 14 usually do not allow this. For example, the ES-1200 above was running in Port-based VLAN mode, which auto-assigns the VID when a new VLAN is created. The ES-1000 was running in MAC-based VLAN mode, which does not use a VID at all.

The learning means 22 uses well established techniques, upon several IEEE standards, including:

802.3 (for Ethernet MAC addresses and frame formats)

802.1D (for Bridge Learning and forwarding tables)

802.1Q (for VLAN IDs and frame tags), all of which are incorporated herein.

IP, ICMP, and SNMP (which are IETF standards) can also be used to discover network devices 14 and gather information about them (including the features described herein. The features are learned in the typical operation of known networks.

Any networking device vendor in business today will support these standards in order to interoperate with other vendors' switching and routing equipment. The method and system 10 described herein takes the same information that every other vendor can use and discover via an NMS or EMS and uses that information to determine multi-device broadcast domain and VLAN memberships. So there's nothing new to learn from a device, no changes required to existing equipment, etc.—just a new way of using this information to manage and monitor the network 12. The learning means 22, identifying means 24, checking means 26, sorting means 28, filtering means 30 and reviewing means 32 can all be software disposed in the network management system 20.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for determining shared broadcast domains of network devices and ports or interfaces comprising the steps of:
   learning features which include MAC addresses about physical ports or logical interfaces of devices of a network by a network management system; and
   identifying which ports or interfaces on each device are part of a common broadcast domain from the learned MAC addresses by determining which MAC addresses have a same unicast MAC address and thus have the common broadcast domain.

2. A method as described in claim 1 wherein the identifying step includes the step of checking for shared features in the devices.

3. A method as described in claim 2 wherein the checking step includes the step of sorting the features based on the learned state.

4. A method as described in claim 3 wherein the checking step includes the step of sorting the features based on the device IDs.

5. A method as described in claim 4 wherein the checking step includes the step of sorting the features based on port or interface where learned.

6. A method as described in claim 5 wherein the checking step includes the step of sorting the features based on VLAN name or VID.

7. A method as described in claim 6 wherein the step of sorting the features based on MAC addresses includes the step of filtering out all the multicast or broadcast addresses.

8. A method as described in claim 7 wherein the step of sorting the features based on learned state includes the step of sorting the features based on self, then learned.

9. A method as described in claim 8 wherein the step of sorting the features based on device IDs includes the step of reviewing the discovery of duplicate MAC addresses on different network forwarding devices, as well as the ports or interfaces that they are learned on, in order to identify these devices' adjacencies and membership in a common broadcast domain.

10. A method as described in claim 9 wherein either physical ports or logical interfaces may be used to identify device adjacencies and membership in a common broadcast domain.

11. A system for determining shared broadcast domains comprising:
    a network having devices which have ports or interfaces, and having a network management system, the network management system having means for learning features which include MAC addresses about ports or interfaces of devices of the network; and
    means for identifying which ports or interfaces on each device are part of a common broadcast domain from the learned MAC addresses by determining which MAC addresses have a same unicast MAC address and thus have the common broadcast domain, the identifying means in communication with the network management system.

12. A system as described in claim 11 wherein the identifying means includes means for checking for shared features in the devices.

13. A system as described in claim 12 wherein the checking means includes means for sorting the features based on MAC addresses.

14. A system as described in claim 13 wherein the checking means includes means for sorting the features based on the learned state.

15. A system as described in claim 14 wherein the checking means includes means for sorting the features based on device IDs.

16. A system as described in claim 15 wherein the checking means includes means for sorting the features based on port or interface where learned.

17. A system as described in claim 16 wherein the checking means includes means for sorting the features based on VLAN name or VID.

18. A system as described in claim 17 wherein the means for sorting the features based on MAC addresses includes means for filtering out all the multicast or broadcast addresses.

19. A system as described in claim 18 wherein the means for sorting the features based on learned state includes means for sorting the features based on self, then learned.

20. A system as described in claim 19 wherein the means for sorting the features based on device IDs includes means for reviewing the discovery of duplicate MAC addresses on different network forwarding devices, as well as the ports or interfaces that they are learned on, in order to identify these devices' adjacencies and membership in a common broadcast domain.

21. A system as described in claim 20 wherein either physical ports or logical interfaces may be used to identify device adjacencies and membership in a common broadcast domain.

22. A system as described in claim 21 wherein the network management system has a MAC-to-broadcast domain table that has shared broadcast domains of the network.

23. A network management system of a network having devices with ports or interfaces comprising:
    means for learning features which include MAC addresses about ports and/or interfaces of devices of the network; and
    means for identifying which ports and/or interfaces on each device are part of a common broadcast domain from the learned MAC addresses by determining which MAC addresses have a same unicast MAC address and thus have the common broadcast domain, the identifying means in communication with the learning means.

24. A method for determining shared broadcast domains of network devices and ports or interfaces comprising the steps of:
    learning features about physical ports or logical interfaces of devices of a network by a network management system; and
    identifying which ports or interfaces on each device are part of a common broadcast domain from the learned features, including the step of checking for shared features in the devices, the checking step includes the step of sorting the features based on MAC addresses, learned state, device IDs, port or interface where learned, VLAN name or VID, the step of sorting the features based on learned state includes the step of sorting the features based on self, then learned, the step of sorting the features based on device IDs includes the step of reviewing the discovery of duplicate MAC addresses on different network forwarding devices, as well as the ports or interfaces that they are learned on, in order to identify these devices' adjacencies and membership in a common broadcast domain, and the step of sorting the features based on MAC addresses includes the step of filtering out all the multicast or broadcast addresses.

25. A method as described in claim 24 wherein either physical ports or logical interfaces may be used to identify device adjacencies and membership in a common broadcast domain.

26. A system for determining shared broadcast domains comprising:
    a network having devices which have ports or interfaces, and having a network management system, the network management system having means for learning features about ports or interfaces of devices of the network; and
    means for identifying which ports or interfaces on each device are part of a common broadcast domain from the learned features, the identifying means in communication with the network management system, the identifying means includes means for checking for shared features in the devices, the checking means includes means for sorting the features based on MAC addresses, the learned state, device IDs, port or interface where learned, VLAN name or VID, the means for sorting the features based on learned state includes means for sorting the features based on self, then learned, the means for sorting the features based on device IDs includes means for reviewing the discovery of duplicate MAC addresses on different network forwarding devices, as well as the ports or interfaces that they are learned on, in order to identify these devices' adjacencies and membership in a common broadcast domain, and the means for sorting the features based on MAC addresses includes means for filtering out all the multicast or broadcast addresses.

27. A system as described in claim 26 wherein either physical ports or logical interfaces may be used to identify device adjacencies and membership in a common broadcast domain.

28. A system as described in claim 27 wherein the network management system has a MAC-to-broadcast domain table that has shared broadcast domains of the network.

* * * * *